3 Sheets—Sheet 1.

J. J. McCULLOUGH.

Preparing and Coating Metals.

No. 8,220. Reissued May 7, 1878.

Witnesses:

Geo. H. Graham.

L. W. Sloat.

Inventor:

J. J. McCullough by C. H. Forbes

Attorney.

3 Sheets—Sheet 2.

J. J. McCULLOUGH.

Preparing and Coating Metals.

No. 8,220. Reissued May 7, 1878.

Witnesses;

Geo. H. Graham.

L. M. Sloat.

Inventor;

Jethro J. McCullough, by E. A. Forbes

Attorney.

3 Sheets—Sheet 3.
J. J. McCULLOUGH.
Preparing and Coating Metals.
No. 8,220. Reissued May 7, 1878.
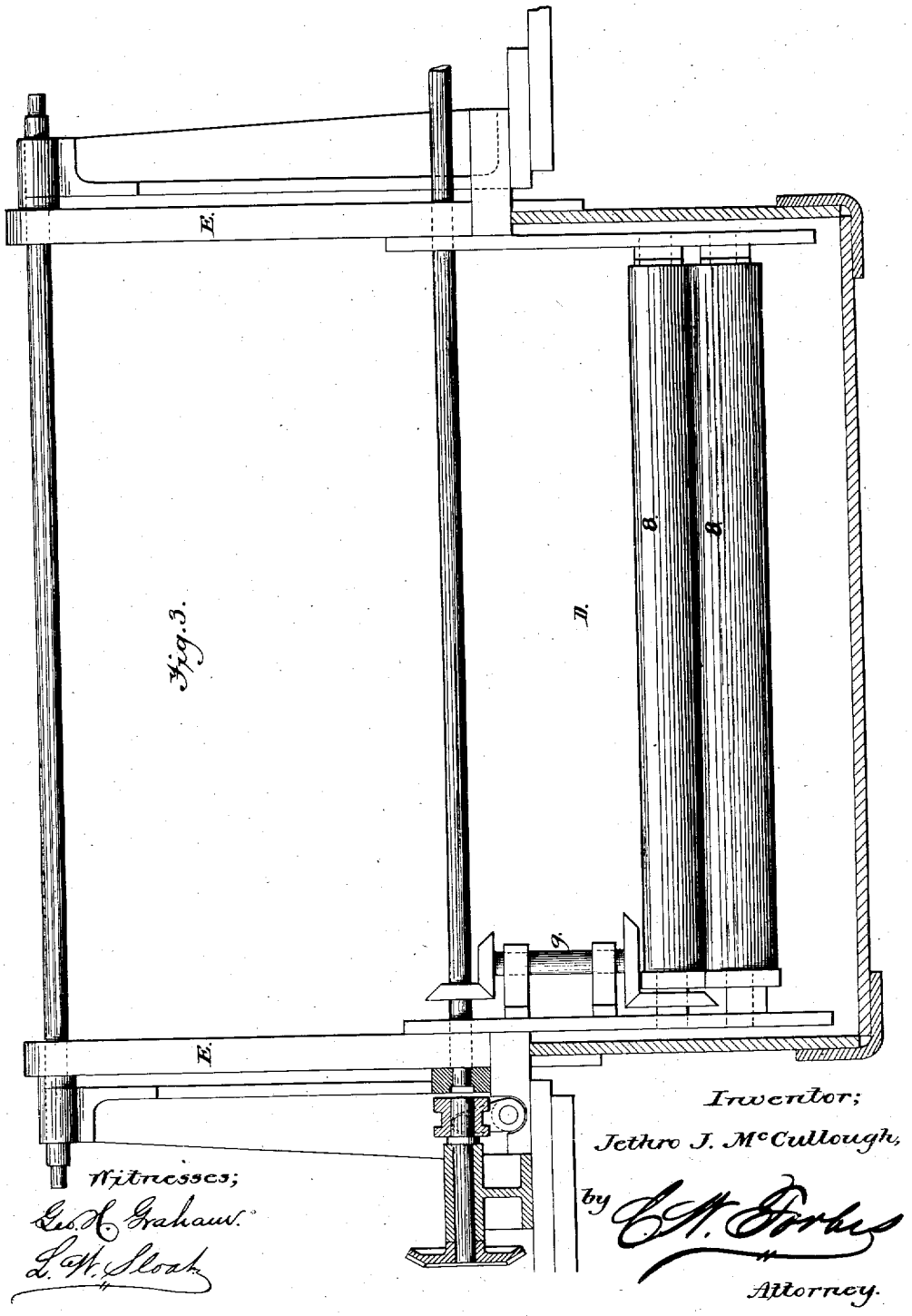

UNITED STATES PATENT OFFICE.

JETHRO J. McCULLOUGH, OF WILMINGTON, DELAWARE.

IMPROVEMENT IN PREPARING AND COATING METALS.

Specification forming part of Letters Patent No. 183,186, dated October 10, 1876; Reissue No. 8,220, dated May 7, 1878; application filed December 7, 1877.

*To all whom it may concern:*

Be it known that I, JETHRO J. McCULLOUGH, of the city of Wilmington, county of New Castle, and State of Delaware, have invented a new and useful Improvement in Processes of Preparing and Coating Metals; and I hereby declare the following to be a full, clear, and exact description thereof.

My invention consists, first, in the combination of certain mechanism for treating sheet metal; and, secondly, in a continuous process of preparing and coating the same by subjecting it to an acid-bath to remove the scale, &c., and, finally, after removing the excess acid from the surface of the withdrawn sheets and preheating, immersing them in the usual coating-bath, as hereinafter claimed.

To enable others skilled in the art to understand my invention, I will proceed to describe the general arrangement of an apparatus by which my process can be applied without entering into the details of construction, as I do not wish to confine myself to the specific devices shown.

Figure 1:
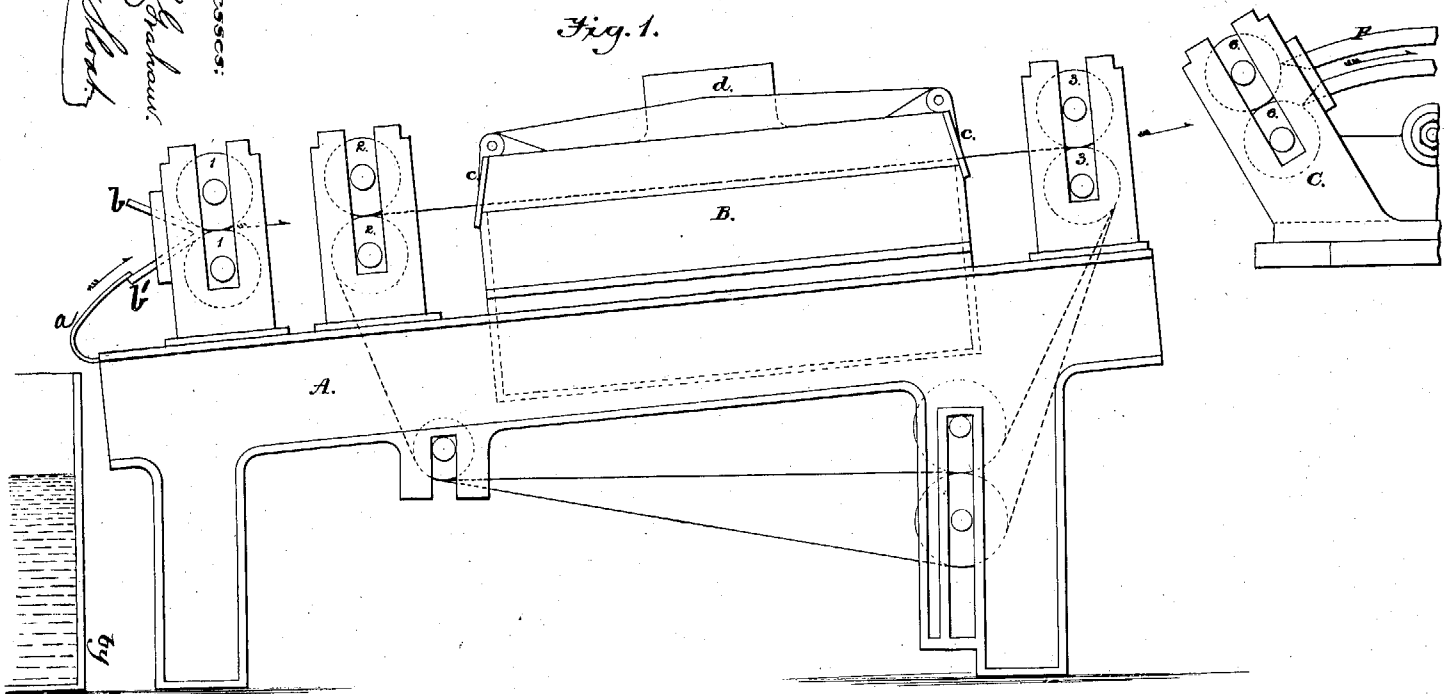
Figure 2:
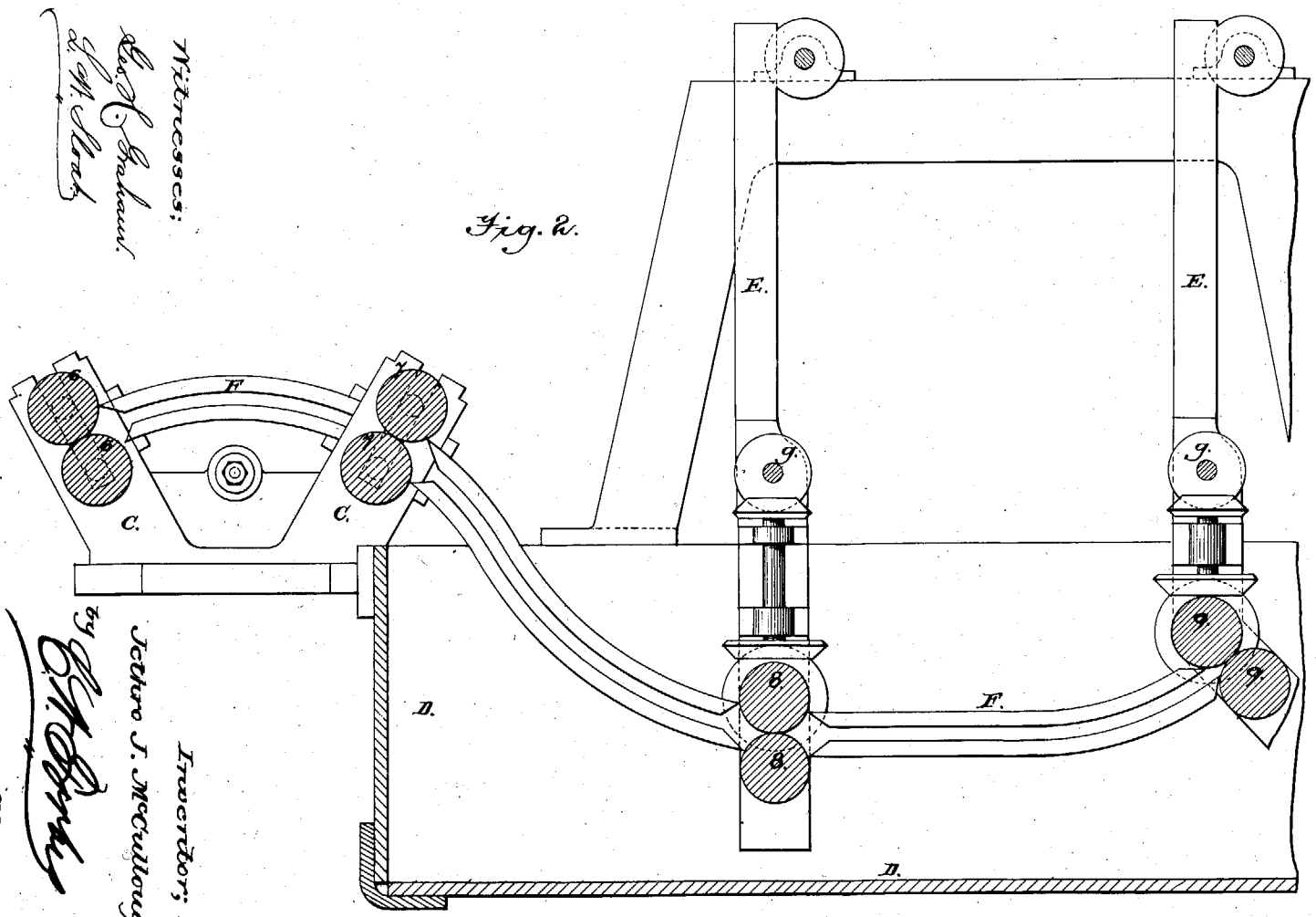

In the accompanying drawings, Figure 1, Sheet 1, is a side elevation of a machine for conveying the sheet of metal from the acid-bath through the heating-furnace. Fig. 2, Sheet 2, is a side view, partly in section, of the coating-bath and intermediate guideway. Fig. 3, Sheet 3, is an end view of the coating-bath.

A, Fig. 1, is a frame or stand to support the furnace and feed-rollers 1 1 2 2 3 3. The rollers 1 1 are composed of an elastic material to remove the adhering acid from the surface of the sheet as it passes between them, and are arranged at the end of the frame nearest the acid-bath to allow the acid to return thereto. The rollers 2 2 3 3 are located at either end of the furnace and convey the sheet of metal therethrough.

The furnace B may be constructed, in any suitable manner, with the necessary fire-box and flue *d*, and the openings for the passage of the sheet may be provided with hinged doors *c c*, as shown.

The operation is as follows: A sheet of metal is placed in the acid-bath, (partly shown in Fig. 1,) and the oxidized portion and foreign substances removed. It is then entered between the flared plates *b b* and passed between the elastic rollers 1 1, which remove the adhering acid and feed the sheet forward through the rollers 2 2, furnace B, and rollers 3 3.

Care must be taken to regulate the speed of the feed-rollers and the intensity of the heat to secure the necessary degree, and still avoid injury to the sheet in passing through.

The coating-bath D, Figs. 2 and 3, is constructed of any desired form or size, and is placed in as close proximity to the furnace as possible, in order to prevent any material change in the temperature of the metal before immersing in the coating material, the metal being expanded in such heated state, and the coating material then applied causes the latter to more firmly combine therewith, which produces a superior product.

In order to direct the sheet of metal into the coating-bath in as nearly a vertical position as possible in the direction of its length, the intermediate guideway F is elevated somewhat above the tank or bath D, and curved to give the sheet the direction stated. This portion of the guideway is also provided with feed-rollers 6 6 7 7, arranged as shown. The guideway F extends downward and through the coating material. The feed-rollers 6 6 7 7 8 8 and the guideway F conduct the sheet forward to and through the coating-bath D.

Connected to the tank or bath D is a framework, E, provided with grooves to accommodate a vertically-sliding frame carrying the feed-rollers 8 8 9 9. These rollers are lowered, as shown in the drawing, when in position for use, and when not in use should be elevated clear of the coating material. A rack and pinion or other suitable devices may be employed for this purpose.

The immersed rollers are, preferably, made of wrought-iron, which is found in practice more effectually to resist the action of the coating material than any other substance.

The various feeding-rollers may be operated by a system of belting or otherwise, and their speed should be regulated to properly subject the metal to the respective heating and coating operations.

The immersed rollers 8 8 9 9 must be operated by gearing or any means that will resist the action of the molten metal to which they are exposed.

The coating apparatus shown is more particularly adapted to manipulating ordinary sheet-iron, as it is not practicable to pass metal of much greater thickness through the circuitous guideway.

It is not deemed necessary to specify the kind of acid used for cleaning the surface of the metal, or the kind of coating material employed, as different kinds of said materials are used, according to the character of the work, all of which is well understood by those skilled in the art to which these processes appertain.

Having thus fully described my invention, what I claim, and desire to secure by Letters Patent, is—

1. In an apparatus for cleansing from acid, and subsequently heating and drying, metal plates, the combination, substantially as described, of elastic rollers for removing the excess of acid from the surfaces of the metal and feeding the plates forward, a heating-furnace, and mechanism for transporting the plates therethrough.

2. The described process of coating sheet metals, which consists in subjecting the sheets to an acid-bath to remove the scale, &c., and, finally, after removing the excess acid from the withdrawn sheets and preheating, immersing them in the usual coating-bath to complete the process, the various stages of treatment being successive and continuous, substantially as and for the purpose set forth.

JETHRO J. McCULLOUGH.

Witnesses:
D. McDANIEL,
C. W. FORBES.